United States Patent [19]
Dick et al.

[11] 4,333,079
[45] Jun. 1, 1982

[54] DOPPLER SIGNAL PROCESSING CIRCUIT

[75] Inventors: John O. Dick; Joe A. McKenzie, both of Riverside, Calif.; William C. Bradford, Hyattsville, Md.

[73] Assignee: The United States of America as represented by the Secretary of the Navy, Washington, D.C.

[21] Appl. No.: 63,975

[22] Filed: Jul. 21, 1970

[51] Int. Cl.³ .............................................. F42C 13/04
[52] U.S. Cl. ................. 343/7 PF; 102/214; 343/18 E
[58] Field of Search ........................... 343/7 PF, 18 E; 102/70.2 P, 214

[56] References Cited
U.S. PATENT DOCUMENTS

| 4,096,480 | 6/1978 | Miner et al. | 343/7 PF X |
| 4,096,805 | 6/1978 | Miner et al. | 343/7 PF X |
| 4,140,060 | 2/1979 | Brenner | 343/7 PF X |

Primary Examiner—T. H. Tubbesing
Attorney, Agent, or Firm—Richard S. Sciascia; Ervin F. Johnston; Thomas M. Phillips

[57] ABSTRACT

A signal processing circuit for producing a warhead firing pulse when the warhead is in a position to cause maximum target damage in a missile, target encounter. The received doppler signal is processed through filter circuits and a first band-pass amplifier. A second band-pass amplifier tuned to pass a narrow portion of the frequency spectrum above the doppler signal is connected in parallel with the first amplifier and its output signal is used to vary the threshold bias to compensate for the presence of extremely noisy signals.

4 Claims, 3 Drawing Figures

4,333,079

DOPPLER SIGNAL PROCESSING CIRCUIT

STATEMENT OF GOVERNMENT INTEREST

The invention herein described may be manufactured and used by or for the Government of the United States of America for governmental purposes without the payment of any royalties thereon or therefor.

BACKGROUND OF THE INVENTION

The present invention relates to doppler signal processing circuits and more particularly to doppler signal processing circuits wherein the amplifier is responsive to the negative going portion of the doppler cycle.

DESCRIPTION OF THE PRIOR ART

Previous signal processing circuits of this type were sensitive to both signal amplitude and frequency, resulting in an erroneous count, causing warhead burst in an ineffective position. In the case of sweep jammers, the interfering signal appears as a positive signal shift and fuze could function on a jamming signal with respect to the target.

SUMMARY OF THE INVENTION

The present invention provides an amplifier circuit for processing doppler signals that is responsive to the negative going portion of the doppler cycle. A parallel band-pass amplifier arrangement provides for controlling the threshold of the threshold circuit by sampling a narrow portion of the frequency spectrum above the doppler signal to generate a control voltage.

Accordingly, an object of this invention is to provide an improved doppler signal processing for use in a guided missile fuze.

Another object is to provide a doppler signal processing circuit which will cause maximum target damage in a missile target encounter.

A further object of the invention is to provide a doppler signal processing circuit which has improved operating characteristics in the presence of extremely noisy signals or countermeasures signals.

Other objects and many of the attendant advantages of this invention will become readily appreciated as the same becomes better understood by reference to the following detailed description when considered in connection with the accompanying drawings wherein.

Figure 1:
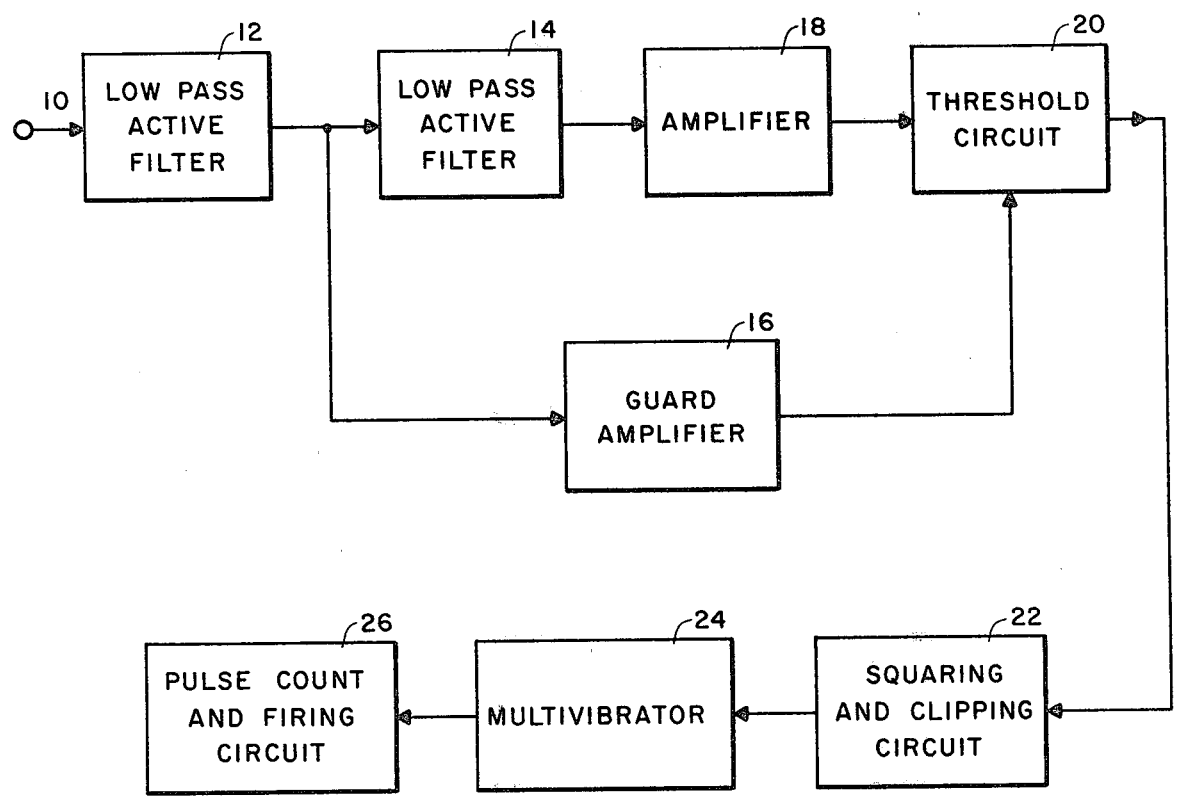
FIG. 1 is a block diagram of a preferred embodiment of the invention.

Referring now to FIG. 1, the incoming detected doppler signal is received at input terminal 10 and fed to low-pass filter 12. Filter 12 may be an active RC, second order, low-pass filter having a Chebishev response with a K factor of 2 and a 3 db cutoff frequency of 3 kHZ. The output of low-pass filter 12 is connected to both low-pass filter 14 and to the input of guard amplifier 16. Filter 14 may be an active RC, second order, low-pass filter having a Butterworth response with a K factor of 1 and a 3 db cutoff frequency of 1200 HZ. Filter 14 has a smooth phase shift which will minimize overshoot of transient signals. The output signal from filter 14 is fed to amplifier 18 and provides an output signal which is fed to threshold circuit 20. The output of guard amplifier 16 is fed as a control voltage to threshold circuit 20.

The signal out of threshold circuit 20 is fed to squaring and shaping circuit 22 to provide an acceptable input for multivibrator 24 which generates a pulse having constant width and amplitude. The pulses out of multivibrator 24 are used to drive pulse count firing circuit 26.

Figure 2A:
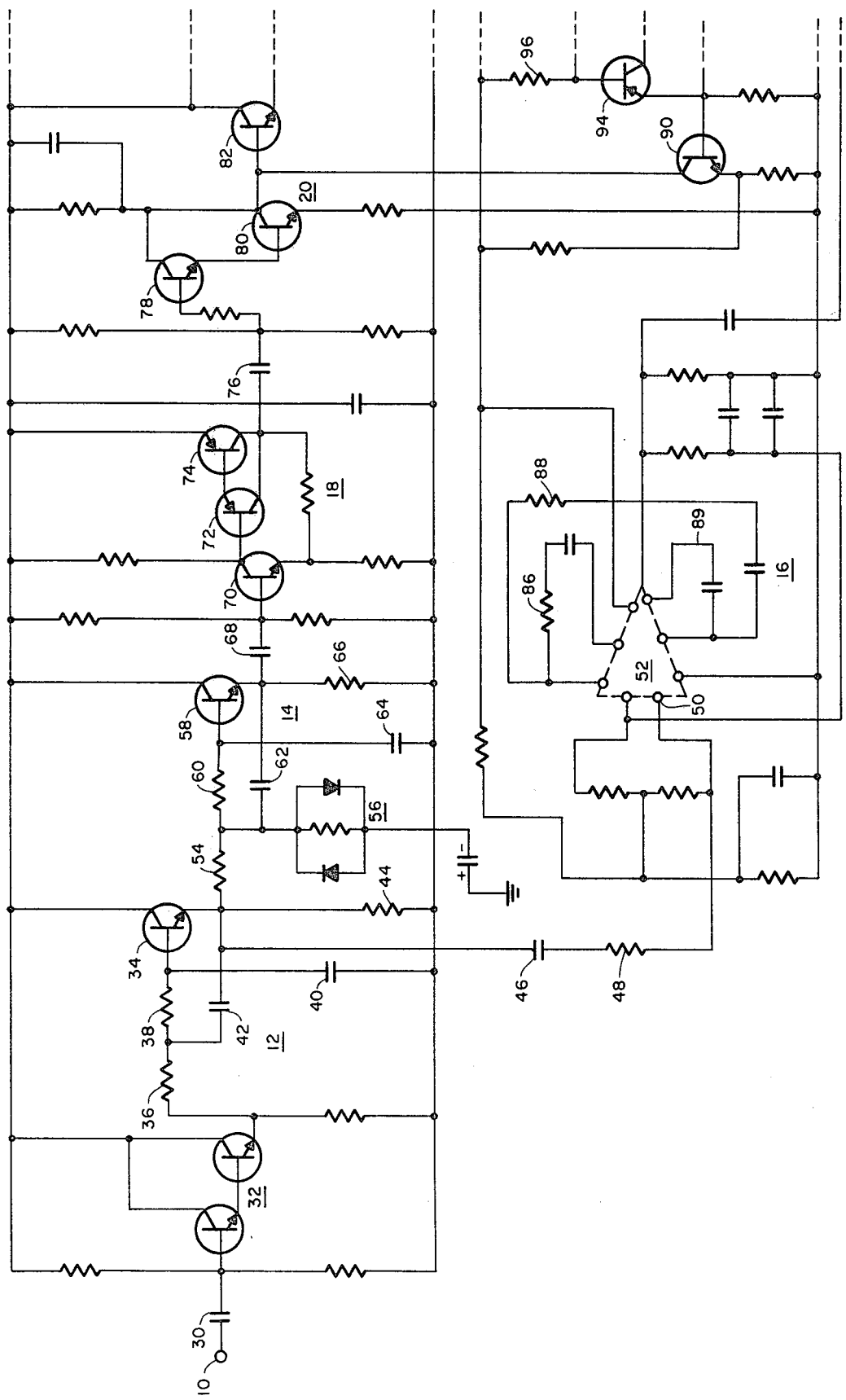
FIGS. 2A and 2B are a schematic diagram of the embodiment of FIG. 1.
Figure 2B:
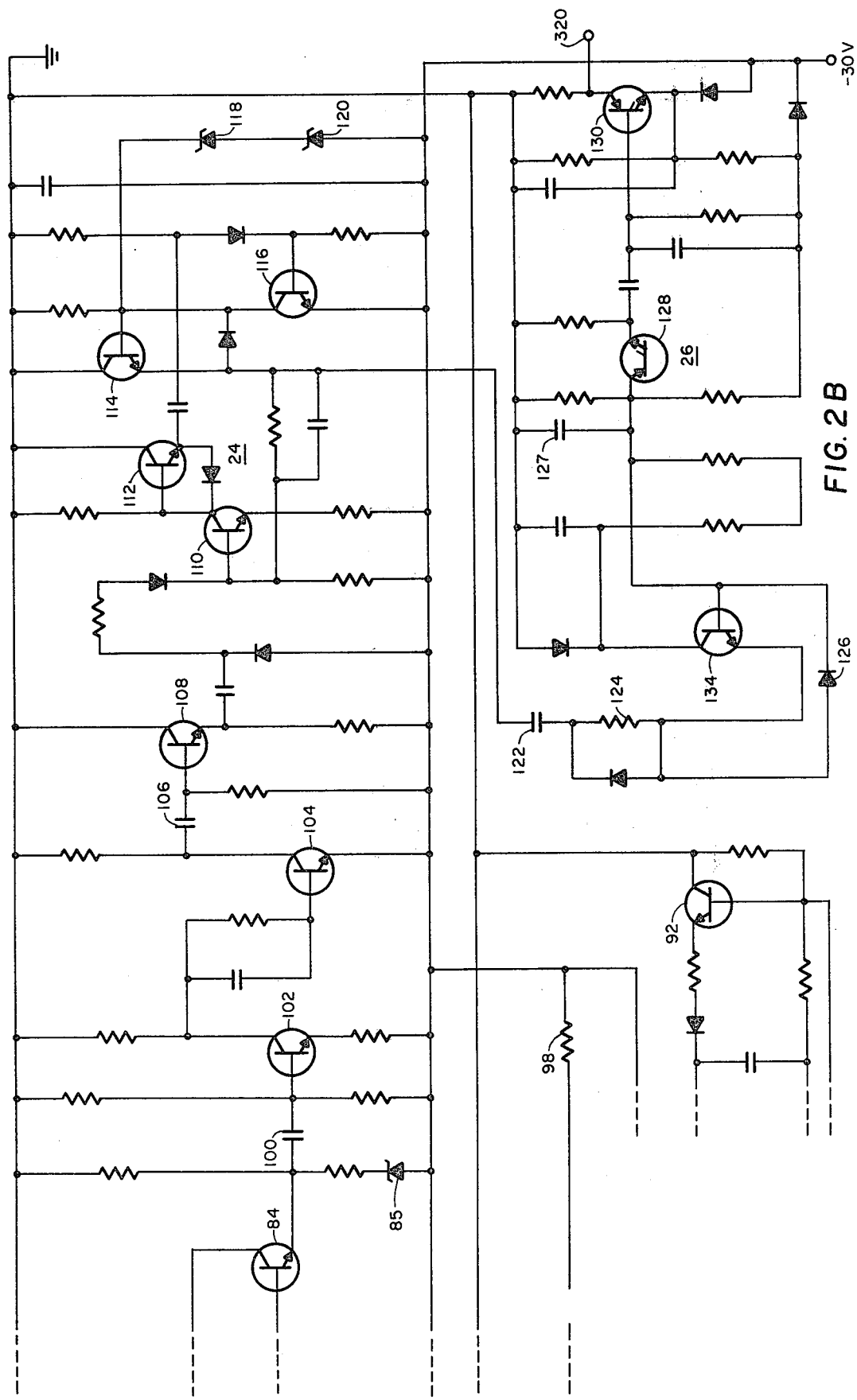

Referring to the schematic diagram of FIGS. 2A and 2B, the input pulse doppler signal at terminal 10 is coupled through coupling capacitor 30 and an impedance matching Darlington emitter follower 32 to low-pass filter 12. The active element of filter 12 is transistor 34. The remaining elements are resistors 36, 38 and capacitors 40, 42. The output across load resistor 44 is fed through coupling capacitor 46 and resistor 48 to input terminal 50 of operational amplifier 52. The output of low-pass filter 12 is also fed to low-pass filter 14 through resistor 54 and across a floating clamp circuit 56. Filter 14 includes transistor 58, resistors 54, 60 and capacitors 62, 64. The output across load resistor 66 is coupled through coupling capacitor 68 to the base of transistor 70. Transistors 70, 72 and 74 amplify the doppler signal where it is coupled through coupling capacitor 76 to the base of transistor 78 of threshold circuit 20. Threshold circuit 20 consists of inverter amplifier transistors 78, 80, and the biased threshold emitter follower transistors 82, 84. The normal emitter bias is fixed by the action of zener diode 85.

Guard channel 16 is an integrated-circuit operational amplifier 52 with feedback loops 86, 88 and 89 to shape the amplifier frequency passband. The signal output from amplifier 52 (a sine wave within the passband 2.5 kHZ to 3.5 kHZ) is rectified and amplified in transistors 90, 92 and 94 and provides a control signal to threshold circuit 20. The control signal controls threshold circuit 20 by decreasing the collector voltage of transistor 80 thereby increasing the bias of transistors 82, 84 and increasing the signal threshold. Guard channel 16 sensitivity control is hard limited through clamp transistor 94. Transistor 94 is base biased by means of voltage divider resistors 96 and 98 so that when the emitter voltage exceeds the voltage divider bias level, the signal is clamped through the transistor saturation resistance (10–15 ohms) to ground.

The collector of transistor 80 is maintained at a constant voltage level and is connected to the base of transistor 82.

The signal out of transistor 84 is coupled by coupling capacitor 100 to the base of transistor 102 which is the first stage of a squaring and shaping circuit. The second stage is transistor 104 and provides a squared signal which is coupled through capacitor 106 and emitter follower transistor 108 to drive squaring multivibrator 24 consisting of transistors 110, 112, 114 and 116. The multivibrator 24 output from the emitter of transistor 114 is clamped at a constant height by means of zener diodes 118 and 120 to produce a constant energy pulse. The output pulse from transistor 114 is coupled through capacitor 122, resistor 124 and diode 126 to charging capacitor 127 and the four-layer diode 128 of pulse counting circuit 26. Each succeeding multivibrator pulse contributes a charge to charging capacitor 127. When the voltage on charging capacitor 127 is sufficient to cause breakdown of diode 128, a trigger pulse is produced. The trigger pulse caused by the discharge of capacitor 127 is fed to silicon controlled rectifier 130 to produce a firing pulse at output terminal 320.

In order to eliminate the logrithmically decreasing voltage step size normally obtained with this type of analog counting circuit, transistor 134 is inserted to equalize the counted voltage steps and ensure firing on the proper pulse.

In operation the output of doppler amplifier 18 is coupled to temperature compensated inverting amplifier (transistors 78,80). The collector voltage of transistor 80, maintained at a constant voltage level, is connected to the base of transistors 82, 84. The emitter of transistor 84 is biased at a fixed voltage slightly positive with respect to the collector of transistor 80. This results in a base to emitter cut-off bias of approximately 1.2 volts (by way of example) which keeps transistors 78 and 80 in a cutoff state. Any AC signal appearing at the collector of transistor 80 must be of sufficient amplitude to exceed the cut-off bias of 1.2 volts plus the emitter-base junction voltage of both transistors 78 and 80. This effectively eliminates any low-level noise signal to minimize unwanted fuze firings.

The output of the guard channel circuit taken from the collector of transistor 90 is connected to the collector of transistor 80 so that a guard channel output signal (DC) increases the above mentioned threshold bias, thereby increasing the level of signal required to pass the threshold.

What is claimed is:

1. In a doppler signal processing circuit for producing a warhead firing pulse in a missile, target encounter, the combination comprising:
    (a) first band-pass amplifier circuit means for amplifying the received doppler signal within a predetermined frequency range,
    (b) second band-pass amplifier circuit means amplifying only received signals of a higher frequency than the doppler signals amplified by said first band-pass amplifier circuit means for generating a control signal proportional to the signal passed by said second band-pass amplifier,
    (c) threshold circuit means coupled to the output of said first and second band-pass amplifier circuit means having a predetermined threshold value that is increased when a control signal is present at the output of said second bandpass amplifier circuit means for passing the signal out of said first band-pass amplifier circuit means when it exceeds the threshold value of said threshold circuit,
    (d) firing pulse generating means coupled to the output of said threshold circuit means for generating a firing pulse in response to a predetermined number of pulses passed by said threshold circuit means.

2. In the signal processing circuit of claim 1 wherein said first band-pass amplifier circuit means includes low-pass active filter means.

3. The signal processing circuit of claim 1 wherein the output of said second band-pass amplifier circuit means includes hard clamping means to provide an absolute limit upon the control voltage.

4. The signal processing circuit of claim 1 wherein said first band-pass amplifier is responsive only to negative going signals and having means to invert said negative signals to positive signals.

* * * * *